(12) United States Patent
Stanger

(10) Patent No.: US 7,649,540 B2
(45) Date of Patent: Jan. 19, 2010

(54) COORDINATE TRANSFORMATIONS SYSTEM AND METHOD THEREOF

(76) Inventor: Virgil Stanger, 751 Alissa Ct., Hollister, CA (US) 95023

( * ) Notice: Subject to any disclaimer, the term of this patent is extended or adjusted under 35 U.S.C. 154(b) by 386 days.

(21) Appl. No.: 11/691,462

(22) Filed: Mar. 26, 2007

(65) Prior Publication Data

US 2007/0222794 A1 Sep. 27, 2007

Related U.S. Application Data

(60) Provisional application No. 60/785,538, filed on Mar. 24, 2006.

(51) Int. Cl.
*G09G 5/00* (2006.01)
*G06K 9/32* (2006.01)
(52) U.S. Cl. .......................... 345/644; 382/293
(58) Field of Classification Search ................ 345/644, 345/646, 647, 648; 382/293, 294, 295
See application file for complete search history.

(56) References Cited

U.S. PATENT DOCUMENTS

| | | | | |
|---|---|---|---|---|
| 5,848,197 | A * | 12/1998 | Ebihara ...................... | 382/275 |
| 6,967,658 | B2 * | 11/2005 | Hunter et al. ............... | 345/473 |
| 7,236,170 | B2 * | 6/2007 | Sepulveda .................. | 345/423 |
| 7,280,707 | B2 * | 10/2007 | Perlmutter et al. .......... | 382/294 |
| 7,394,946 | B2 * | 7/2008 | Dewaele ...................... | 382/276 |
| 7,420,574 | B2 * | 9/2008 | Santos ........................ | 345/646 |
| 2005/0231510 | A1 * | 10/2005 | Santos ........................ | 345/473 |
| 2005/0259882 | A1 * | 11/2005 | Dewaele ..................... | 382/243 |
| 2008/0279447 | A1 * | 11/2008 | Friedlander et al. ......... | 382/154 |

OTHER PUBLICATIONS

Anderson, James M. and Mikhail, Edward M. "Surveying Theory and Practice," 7th Edition. pp. 32, 818, 1111-1119. McGraw Hill Company's, Inc. 1998.
Bronson, Richard. "Schaum's Outline of theory and Problems of Matrix Operations. pp. 11-21, 24-33, 34-41, 128-135." McGraw Hill, Inc. 1989.
Buckner, R. B. "Surveying Measurements and their Analysis," First Edition. pp. 262-269. Landmark Enterprises. 1980.
Moffitt, Francis H. and Bouchard, Harry. "Surveying," Sixth Edition. pp. 819, 820. Intext Educational Publishers. 1975.

(Continued)

*Primary Examiner*—Ryan R Yang
(74) *Attorney, Agent, or Firm*—Intellectual Property Law Group LLP; Juneko Jackson; Otto O. Lee

(57) ABSTRACT

A two-dimensional coordinate transformations software program and method thereof is described. In one aspect, the present invention solves problems of accurately and efficiently placing data from Records of Surveys, subdivision plats, deeds, highway right of way plats, and other map data onto the State Plane Coordinate Systems or other projection systems. The users of the software include engineers, especially those involved in right-of-way engineering, and Geographic Information Systems (GIS) and Land Information Systems (LIS) specialists. In one aspect, a utility program is intended to supplement the coordinate geometry and GIS/LIS software currently used by surveyors and GIS/LIS specialists. In one embodiment, there is an efficient and speedy method to surveying, offering a preferred point and click approach using a unique graphical user interface of the two-dimensional coordinate transformation program.

20 Claims, 14 Drawing Sheets

OTHER PUBLICATIONS

Rainsford, Hume F. "Survey Adjustments and Least Squares." pp. 198-202. Clarke, Doble & Brendom, Ltd. 1968.

Wolf, Paul R. "Adjustment Compuations, Practical Least Squares for Surveyors," Second Edition. pp. 50-56, 58-66, 68-77. Landmark Enterprises. 1980.

Wolf, Paul R. and Ghilani, Charles D. "Adjustment Computations, Statistics and Least Squares in Surveying and GIS," Third Edition. pp. 335-347. John Wiley & Sons. (1997).

Yang, Qihe; Snyder, John P.; and Tobler, Waldo R. "Map Projection Transformation Principles and Applications." p. 181-187, 333-339. Taylor & Francis. 2000.

* cited by examiner

US 7,649,540 B2

COORDINATE TRANSFORMATIONS SYSTEM AND METHOD THEREOF

CROSS-REFERENCE TO RELATED APPLICATION

This application claims priority to U.S. provisional patent application Ser. No. 60/785,538, filed on Mar. 24, 2006, which is hereby incorporated by reference in its entirety.

BACKGROUND OF INVENTION

1. Field of Invention

Aspects of the invention relate to a method for and software program for the surveying and engineering communities, for instance those involved in right-of-way engineering, and Geographic Information Systems (GIS) and Land Information Systems (LIS) specialists, and in particular, a method for and software program for two-dimensional coordinate transformations.

2. Background

There exist products which offer only the 4-parameter linear transformation, which is a useful transformation for most surveyors, but does not adequately address the needs of Geographic Information Systems (GIS) and Land Information Systems (LIS) specialists. GIS/LIS specialists need transformations that will adequately address the problem of transforming existing map data from one projection system to another, for instance data from an Albers equal-area projection to a conformal projection in the State Plane Coordinate System. A user should be aware before even attempting a transformation under these circumstances that the scale in the directions of the x and y-axis will be different, which would almost certainly dictate an affine or general bivariate polynomial transformation of the $2^{nd}$ to $5^{th}$ power. In some instances, an 8-parameter projective transformation would be better. Therefore, there exists a need for a very quick method of computing any of these transformations, along with map accuracy statistics, which will yield instantaneous information for a valid comparison.

Presently, there are no known programs that offer Conformal Polynomial Transformations. Conformal Polynomial Transformations are particularly useful when a surveyor or GIS/LIS professional wants to hold all of the transformed System 2 control coordinate pairs to the exact value of the corresponding System 1 control coordinate pairs, and at the same time ensure that the shape of any figure defined in the System 1 Cartesian plane will be best preserved.

For a transformation to be defined as conformal, the following Cauchy-Riemann equations must be satisfied:

$$\delta X/\delta x = \delta Y/\delta y \text{ and; } \delta X/\delta y = -\delta Y/\delta x$$

SUMMARY

An embodiment of the present invention solves problems of accurately and efficiently placing data from Records of Surveys, subdivision plats, deeds, highway right of way plats, and other map data onto the State Plane Coordinate Systems or other projection systems. Users of the software of the present invention would include the surveying and engineering communities, especially those people involved in right-of-way engineering, and the Geographic Information Systems (GIS) and Land Information Systems (LIS) specialists. The software and methods according to embodiments of the present invention would provide users a preferred option rather than the scanning and digitizing methods currently used, and will do so in a cost efficient manner.

An embodiment of the present invention is a utility program and method intended to supplement the coordinate geometry and GIS/LIS software currently used by surveyors and GIS/LIS specialists. In one embodiment, it is written on the Microsoft Visual Studios programming platform, and is completely event driven.

The embodiment of the present invention providing Two-Dimensional Coordinate Transformations offer Conformal Polynomial Transformations from the $2^{nd}$ to the $11^{th}$ powers. Therefore, the 12 control coordinate pairs in the System 2 Cartesian plane can be held to the corresponding System 1 Cartesian plane control.

An object of an embodiment of the present invention is to provide for a unique graphical user interface of the two-dimensional coordinate transformation program. According to this embodiment, it is possible for a user to compute a transformation without entering one bit of data from the keyboard. In most cases, the only times the user will be required to enter data from the keyboard is to edit the weights or enter a date and some remarks in the Results screen. An object of the present invention is to provide a speedier method to surveying and offers the preferred point and click approach.

An object according to an embodiment of the present invention is to also provide a method of least squares to be incorporated into the transformation program. Mathematicians have been working for decades on the best way to solve systems of over-determined equations, which is what least-squares computations are in the final analysis. According to the embodiment of the present invention, a unique algorithm for these least squares operations embodied in a computer-readable medium is provided.

Another object according to an embodiment of the present invention is to use only upper or lower matrix decompositions in the matrix operations involved. This in itself halves the mathematical operations required. Advanced survey adjustment books advise programmers that, if possible, direct least squares solutions of over determined equations should be utilized, such as the lower Cholesky decomposition method. This is because the commonly used method of solving for the parameters using inverses is so inefficient. However, this also presents a problem, because the principle diagonal of the inverse consists of the variances of the unknown parameters that are being determined, and the upper or lower off diagonal the co-efficient parameters. This is the reason that the inverse is called the co variance matrix. An embodiment of the present invention provides a simple and efficient method of determining these diagonal elements and that method is incorporated as part of a computer program of the present invention.

An embodiment of the present invention employs a most efficient code for solving the unique systems of linear equations that arise when the exact minimum number of Systems 1 and 2 control coordinate pairs are entered for a transformation. The program according to an embodiment of the present invention further uses Gaussian elimination with scaled pivoting which provides an optimum method.

An embodiment of the present invention may be used to supplements a user's coordinate geometry and GIS software. In another embodiment of the present invention, the program will provide a method of divided differences to transform third order survey control from one projection system to another. In another embodiment, the method will employ the use of adjustment techniques for certain surveys that do not form closed systems, such as BLM surveys.

Embodiments of the present invention offer the user fast and efficient results using a code which is fast and theoretically sound, and offers many more options than presently available. In an embodiment, the user loads System 1 control coordinates and System 2 control coordinates from a file through a user interface, the control coordinate pairs from System 1 and System 2 are matched, a transformation is selected, the user selects the minimum number of matched control coordinate pairs required for the selected transformation, the transformation is computed, wherein the transformed System 2 coordinates are held to the System 1 control coordinates for a selected transformation. Implementations of the present invention include a method or process, an apparatus or system, or computer software on a computer-readable medium.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

Figure 1A:
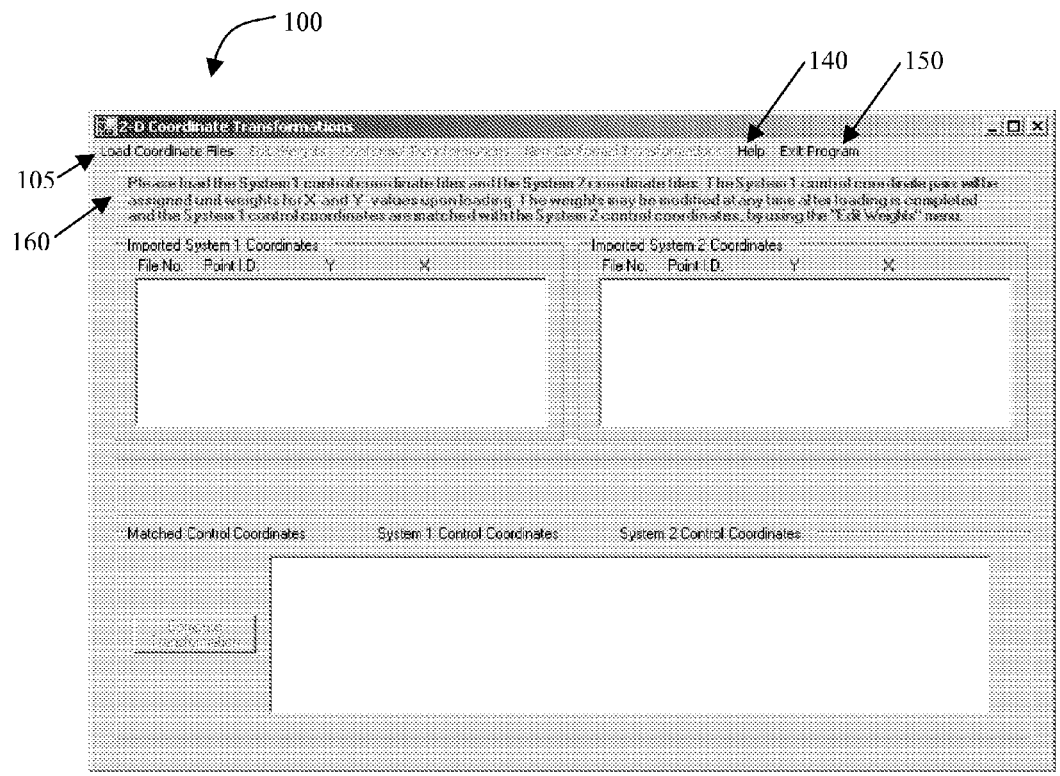
FIG. 1A is a screenshot of a Load Coordinate Files, Help, and Exit Program menu activated when the user begins the program, according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Two-Dimensional Coordinate Transformations of the present invention may be embodied as a utility computer program intended to supplement the coordinate Geometry and GIS/LIS software currently used by surveyors and GIS/LIS specialists. In one embodiment of the present invention, the program is written on the Microsoft Visual Studios programming platform, and may be completely event driven.

This program according to an embodiment of the present invention, comprises several Non-Conformal and Conformal Two-Dimensional Coordinate Transformations. The Non-Conformal Two-Dimensional Coordinate Transformations include the Six Parameter Affine Transformation, the Eight Parameter Projective Transformation, and General Bivariate Polynomial Transformations from the 2nd to the 5th powers. The Conformal Two-Dimensional Coordinate Transformations available include the Four Parameter Linear Transformation and Conformal Bivariate Polynomials from the 2nd to the 11th powers. A brief description of each of these transformations and their mathematical models used in some embodiments of the present invention are described below.

Non-Conformal Two Dimensional Transformations

The Six Parameter Affine Coordinate Transformation

Defined by Parametric Equations:

$$Y=a1x+a2y+a3$$

$$X=b1x+b2y+b3$$

There are two different scale factors in this transformation, one in the x direction and one in the y-direction. There are two translations in x and y, a rotation about the origin, and a small non-orthogonality correction, or skew, between the x and y-axis, or a total of six unknown coefficients to solve for. Three known control points in each Cartesian system will yield six equations with six unknown coefficients. This transformation is used in photogrammetric coordinate transformations to account for different shrinkage factors in the x and y axes of the photo. The same assumption is valid for transforming scaled or digitized coordinates from map or plat sources.

Eight Parameter Projective Coordinate Transformation

Defined by Parametric Equations:

$$Y = \frac{a1x+b1y+c1}{a3x+b3y+1}$$

$$X = \frac{a2x+b2y+c2}{a3x+b3y+1}$$

This projection describes the central projectivity between two Cartesian planes, and is also used in photogrammetry. Some advanced survey references advocate transforming NAD '27 State Plane Coordinates to NAD '83 State Plane Coordinates with this transformation. Eight known control points in each Cartesian system will yield eight equations with eight unknown coefficients.

General Bivariate Polynomial Coordinate Transformations

These are essentially Affine Transformations with added polynomials in 2nd, 3rd, $4^{th}$ and higher order terms, which allow for some change of shape between systems, their numerical form defined as follows for equations with P coefficients:

$$Y=a1x+a2y+(c1x+c2y)^2+(c3x+c4y)^3+\ldots+a(P)$$

$$X=b1x+b2y+(d1x+d2y)^2+(d3x+d4y)^3+\ldots+b(P)$$

These equations are expanded to the following linear form:

$$Y=a1x+a2y+a3x^2+a4xy+a5y^2+a6x^3+a7x^2y+a8xy^2+a9y^3\ldots+a(P)$$

$$X=b1x+b2y+b3x^2+b4xy+b5y^2+b6x^3+b7x^2y+b8xy^2+b9y^3\ldots+b(P)$$

The formula for the minimum number N of known control points common to both Systems 1 and 2 Cartesian planes for a General Bivariate Polynomial of degree n takes the form: $N=\frac{1}{2}(2+n)(1+n)$. The number of coefficients P to be determined for a General Bivariate Polynomial of degree n is: $P=2N$.

The minimum required number N of known control points common to both Systems 1 and 2, and the number of coefficients P to be determined for the General Bivariate Polynomials of degree n included in this program are:

For n=2, N=6, P=12

For n=3, N=10, P=20

For n=4, N=15, P=30

For n=5, N=21, P=42

Conformal Two Dimensional Transformations

For any system of parametric equations $X=f1(x,y)$ and $Y=f2(x,y)$ to define a conformal coordinate transformation, the following Cauchy-Riemann equations must be satisfied:

$$\delta X/\delta x=\delta Y/\delta y \text{ and; } \delta X/\delta y=-\delta Y/\delta x$$

Where:

$\delta X/\delta x$ is the partial derivitive of X with respect to x, $\delta Y/\delta y$ is the partial derivitive of Y with respect to y, $\delta X/\delta y$ is the partial derivitive of X with respect to y and $\delta Y/\delta x$ is the partial derivitive of Y with respect to x.

The Cauchy-Riemann equations can be used to determine if a transformation is conformal, and also to derive a conformal transformation. These equations ensure conformality for a very small, or differential area, in the same sense that they are used to derive and ensure conformality for the Lambert Conformal Conic and Transverse Mercator Projections used in the State Plane Coordinate Systems, and all other Conformal Projections. According to an embodiment of the present invention, the program provides for Conformal Polynomial Transformations, allowing the user to hold all of the transformed System 2 control coordinate pairs to the exact value of the corresponding System 1 control coordinate pairs, and at the same time ensure that the shape of any figure defined in the System 1 Cartesian plane will be best preserved.

The Four Parameter Linear Coordinate Transformation

Defined by Parametric Equations:

$$Y=a1y+a2x+a3$$

$$X=a1x-a2y+a4$$

There is one constant scale factor in this transformation, two translations in the x and y directions, and a constant rotation about the origin, or a total of four unknown coefficients to solve for. Two known control points in each Cartesian system will yield four equations with four unknown coefficients.

This is the only transformation that ensures uniform scale, rotation, and translation throughout the entire transformed system, and consequentially ensures that the shape of any figure will be unchanged after transformation, according to an embodiment of the present invention. It should be the transformation of choice for coordinate pairs which define subdivisions, highways, or any survey involving circular curves, since curves will be transformed as arcs of circular curves, with all lines tangent to curves remaining tangent after transformation. An affine transformation, for instance, will yield transformed arcs of circular curves as arcs of ellipses.

Conformal Bivariate Polynomial Coordinate Transformations

These are formed by imposing the Cauchy-Riemann equations on the General Bivariate Polynomials described above. These transformations are essentially Four Parameter Linear Coordinate Transformations with added polynomials in 2nd, 3rd, 4th and higher order terms, which allow for some change of shape between systems 1 and 2 and defined as follows for equations with P coefficients:

$$Y=a1y+a2x+a3(2xy)-a4(x^2-y^2)+\ldots+a(P-1)$$

$$X=a1x-a2y+a3(x^2-y^2)+a4(2xy)+\ldots+a(P)$$

The formula for the minimum number N of known control points common to both Systems 1 and 2 Cartesian planes for a Conformal Bivariate Polynomial of degree n takes the form: N=(1+n). The number of coefficients P to be determined for a Conformal Bivariate Polynomial of degree n is: P=2N.

The minimum required number N of known control points common to both Systems 1 and 2, and the number of coefficients P to be determined for the Conformal Bivariate Polynomials of degree n included in this program are:

For n=2, N=3, P=6
For n=3, N=4, P=8
For n=4, N=5, P=10
For n=5, N=6, P=12
For n=6, N=7, P=14
For n=7, N=8, P=16
For n=8, N=9, P=18
For n=9, N=10, P=20
For n=10, N=11, P=22
For n=11, N=12, P=24

According to an embodiment of the present invention, a system of linear equations can be written directly from the discrete Systems 1 and 2 control coordinate pairs for all of these Transformations except the Eight Parameter Projective Transformation, which is not linear.

Approximate linear equations using first order Taylor series are formed for this transformation, in terms of the partial derivatives of the eight unknown coefficients with respect to Y and X, the differentials of the unknown parameters, the System 1 control coordinate pairs, and a close approximation for the eight unknown coefficients. Close approximate values of all eight coefficients can be determined by expanding the original equations described above to the following linear form:

$$Y=a1x+b1y-a3xY-b3yY+c1$$

$$X=a2x+b2y-a3xX-b3yX+c2$$

Further, according to an embodiment of the present invention the eight initial coefficients are computed by solving this approximate system by Gaussian or least-squares methods, as described below, depending on whether the required solution is exact or least-squares. A set of approximate linear equations are then written, using first order Taylor series as described above, after which an iteration process loops a unique or least-squares solution method, whichever is appropriate, to determine corrections to the initial coefficients until the corrections are sufficiently small enough to determine that there is a convergence to a final solution.

If the Systems 1 and 2 control coordinates selected are the exact number required for a unique solution, the matrices will describe a set of linear independent normal equations A*X=L, where A is a matrix of dimension n×n, X is a column matrix of unknown coefficients of dimension n, and L is a column matrix of known parameters of dimension n. If N=the number of control coordinate pairs then n=2N. The program according to an embodiment of the present invention solves this system using Gaussian elimination with scaled pivoting. An example of this system for the Four Parameter Linear Transformation, with N=2 and n=2N=4, is as follows:

$$\begin{array}{ccc} A & X & = L \\ \begin{vmatrix} x1 & -y1 & 1 & \\ x1 & y1 & & 1 \\ x2 & -y2 & 1 & \\ x2 & y2 & & 1 \end{vmatrix} & \begin{vmatrix} a1 \\ a2 \\ a3 \\ a4 \end{vmatrix} = & \begin{vmatrix} X1 \\ Y1 \\ X2 \\ Y2 \end{vmatrix} \end{array}$$

If the Systems 1 and 2 control coordinates selected are more than the exact number required for a unique solution, then an over determined system of equations of the form P*A*X=P*L+P*V will be defined, where A is a matrix of dimension m×n, P is a diagonal weight matrix of dimension m×m, consisting of the weights assigned for the System 1 control coordinates, X is a column matrix of unknown coefficients of dimension n, L is a column matrix of known parameters of dimension m, and V is a column matrix of unknown residuals of dimension m. The dimension m is determined by the number N of selected Systems 1 and 2 control points, or m=2N, and n is determined by the number of unknown coefficients to be determined. This system can have an infinite number of solutions, the solution desired is a least-squares solution, which minimizes the sum of the squares of the residuals, typically described as a system of normal equations AT*P*A*X=AT*P*L+AT*P*V, where AT is the transpose of A.

An example of these matrices for the Four Parameter Linear Transformation with N control coordinate pairs, with m=2N, and n=4, is as follows:

$$A = \begin{vmatrix} x1 & -y1 & 1 & \\ x1 & y1 & & 1 \\ x2 & -y2 & 1 & \\ x2 & y2 & & 1 \\ x3 & -y3 & 1 & \\ x3 & y3 & & 1 \\ \ldots & \ldots & \ldots & \\ \ldots & \ldots & & \ldots \\ xN & -yN & 1 & \\ xN & yN & & 1 \end{vmatrix}$$

$$AT = \begin{vmatrix} x1 & x1 & x2 & x2 & x3 & x3 & \cdots & \cdots & xN & xN \\ -y1 & y1 & -y2 & y2 & -y3 & y3 & \cdots & \cdots & -yN & yN \\ 1 & & 1 & & 1 & & \cdots & \cdots & 1 & \\ & 1 & & 1 & & 1 & \cdots & \cdots & & 1 \end{vmatrix}$$

$$P = \begin{vmatrix} Px1 & & & & & & & & \\ & Py1 & & & & & & & \\ & & Px2 & & & & & & \\ & & & Py2 & & & & & \\ & & & & Px3 & & & & \\ & & & & & Py3 & & & \\ & & & & & & \ldots & & \\ & & & & & & & \ldots & \\ & & & & & & & & PxN & \\ & & & & & & & & & PyN \end{vmatrix}$$

The program according to an embodiment of the present invention assigns the X and Y values for all System 1 control coordinate pairs a unit weight when the user first loads the data. An Edit Weights form is provided if the user wishes to assign different weights.

$$X = \begin{vmatrix} a1 \\ a2 \\ a3 \\ a4 \end{vmatrix} \quad L = \begin{vmatrix} X1 \\ Y1 \\ X2 \\ Y2 \\ X3 \\ Y3 \\ \cdots \\ \cdots \\ XN \\ YN \end{vmatrix} \quad V = \begin{vmatrix} vX1 \\ vY1 \\ vX2 \\ vY2 \\ vX3 \\ vY3 \\ \cdots \\ \cdots \\ vXN \\ vYN \end{vmatrix}$$

AT*P*A is a symmetric, positive definite matrix, and so the Cholesky decomposition method according to an embodiment of the present invention, can be used to significantly reduce the computer storage and computational effort required. Using this method, only the upper triangular portion of AT*P*A need be formed, and rather than a diagonal weight matrix of dimension m×n, a column matrix P of dimension m can be formed and used. Therefore, all of the theoretical matrix computations described above can be, if not circumvented, considerably shortened. This program forms, directly from the P, A and L matrices, the upper triangular portion only of the normal equation matrix AT*P*A and the column matrix AT*P*L. The lower Cholesky decomposition of AT*P*A is then computed. The column matrix X of unknown coefficients is determined by post-multiplying AT*P*L by the inverse of the lower Cholesky decomposition of AT*P*A.

The inverse of AT*P*A is a symmetric, positive definite matrix, and is commonly referred to as the covariance matrix, since the elements on the principle diagonal are the variances of the unknown parameters being solved for, and the lower or upper off-diagonals are their correlation coefficients. The inverse of AT*P*A is computed by post multiplying the inverse of the lower Cholesky decomposition of AT*P*A by its transpose. The program of an embodiment of the present invention computes the diagonal elements only of the inverse of AT*P*A, which are the variances of the computed transformation coefficients. These variances are used to compute and display the standard deviations, or confidence intervals, of the parameters displayed on the screen and, if desired, on a printout of the transformation results. The residuals stored in matrix V are used to compute MSEX and MSEY, the Mean Square Errors between the System 1 and transformed System 2 control coordinate pairs, and also RMSPE, the Root Mean Square Positional Error. These are map accuracy parameters, and defined as follows:

$$MSEX = [vX1^2 + vX2^2 + vX3^2 + \ldots + vXN^2]/N$$

$$MSEY = [vY1^2 + vY2^2 + vY3^2 + \ldots + vYN^2]/N$$

$$RMSPE = [MSEX + MSEY]^{1/2}$$

The numbers generated by the General Bivariate Coordinate Transformations and the Conformal Bivariate Polynomial Coordinate Transformations can get very large as the exponents increase past the 2nd power, and so this program according to an embodiment, translates the System 2 x & y coordinates to small numerical values before computing a selected transformation. This does not change the shape of any figure described by the System 2 coordinates, and so does not adversely affect the transformation. The parameters of the transformation will be the parameters of this new translated system, however, and so the translation in the y and x directions may be displayed in a paragraph above the listing of the transformation parameters.

The coefficients that are very small, or approaching zero, are displayed in scientific notation, or standard E-Formatting code, which displays one digit to the left of the decimal point and six digits to the right of the decimal point, followed by the character E and a three digit integer representing the exponent of a power of ten, according to an embodiment of the present invention.

The following illustrations describe an embodiment of the present invention when implementing the two-dimensional coordinate transformations program. The illustrations are not to be considered a limitation in the scope of the invention, but are merely illustrative.

In an embodiment of the present invention, a unique graphical user interface is utilized for implementing the program. The program may be encoded on computer-readable media and runs on a computer system comprising the necessary computing components, processor(s), memory, database(s), input/output devices, server(s) or any necessary network components for implementing the program on a network. As illustrated in FIG. 1A, a Main Form 100 is displayed when the user begins the program. In the Main Form 100, a Load Coordinate Files 105, Help 140 and Exit Program 150 menus are activated when the user begins the program. Instructions or message 160 may be shown in different color font, such as a red lettering at the top of the screen. Similarly, instructions or messages shown in other forms or boxes may be highlighted in a similar fashion such as different color, among others. Instructions 160 remind the user to load a set of first system control coordinate files and a set of second system control coordinate files, the System 1 control coordinate files and the System 2 coordinate files, respectively. The user is also apprised that the System 1 control coordinate pairs will be assigned unit weights upon loading, and how these weights are assigned may be changed. In an embodiment of the present invention, the weights are changed by using the Edit Weights menu 110.

Figure 1B:
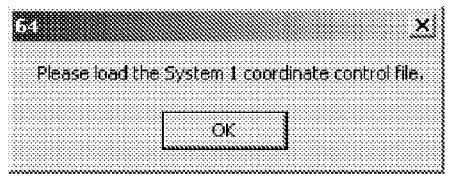
FIG. 1B shows a message box to prompt the user to load the System 1 coordinate control files, after pressing the Load Coordinate Files menu, according to an embodiment of the present invention.
Figure 2A:
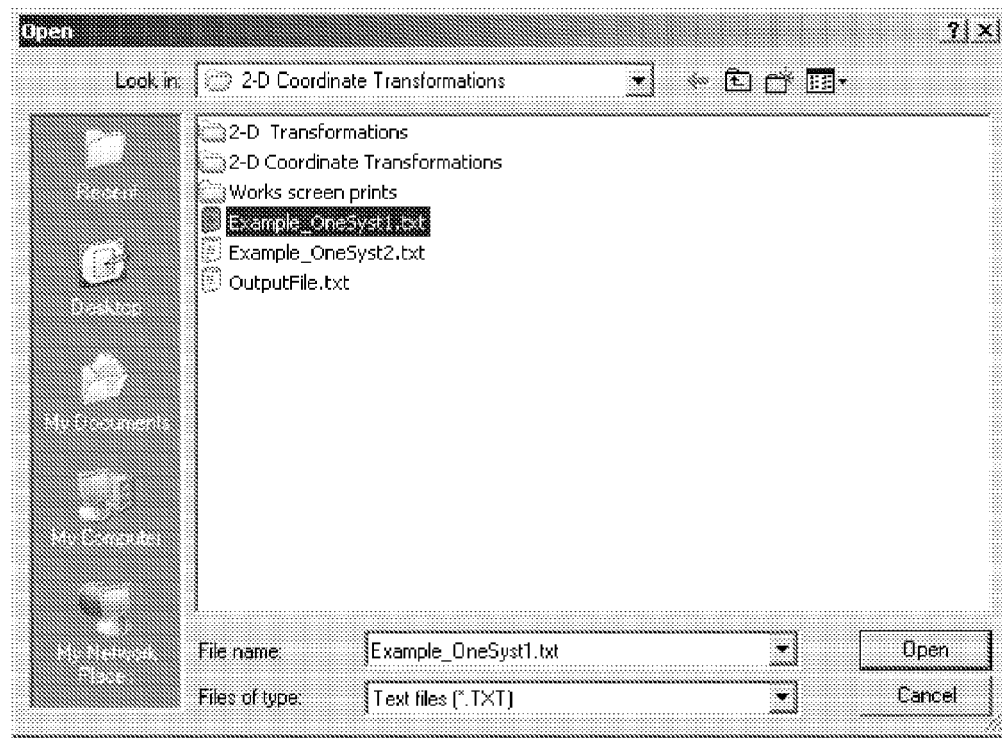
FIG. 2A is a screenshot of an input dialog to allow the user to browse through the computer to where the System 1 control coordinate files are located, according to an embodiment of the present invention.
Figure 2B:
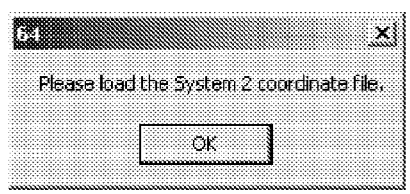
FIG. 2B shows a message box to prompt the user to load the System 2 coordinate control files, according to an embodiment of the present invention.
Figure 3A:
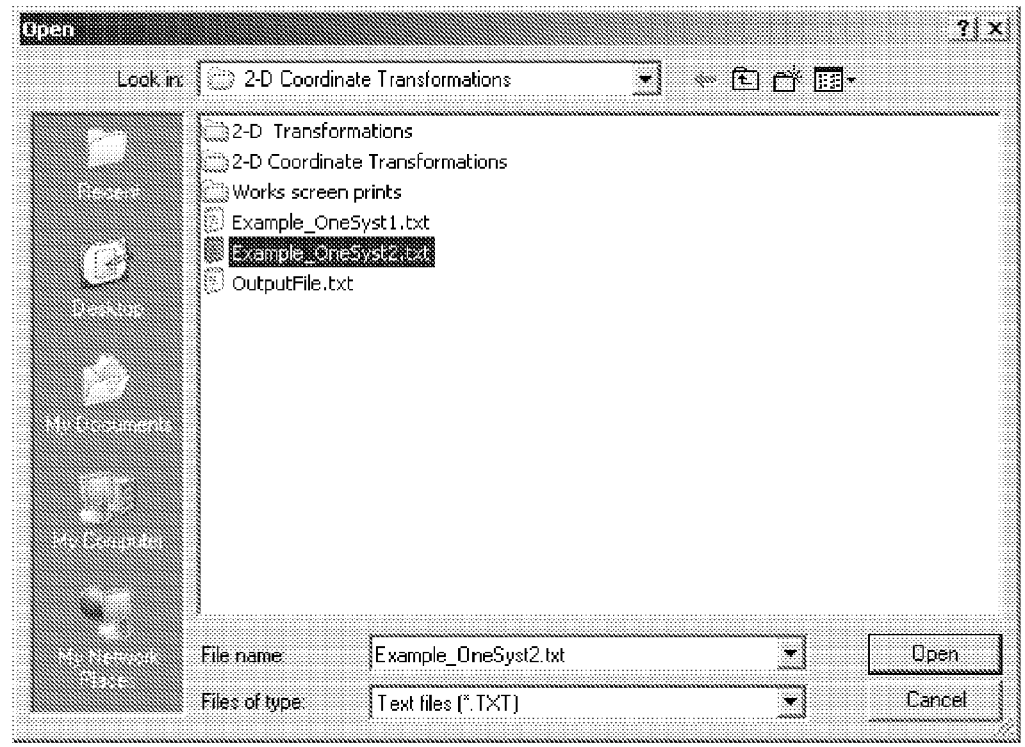
FIG. 3A is a screenshot of an input dialog to allow the user to browse through the computer to locate the System 2 coordinate files, according to an embodiment of the present invention.

As shown in FIG. 1B, a message box then prompts the user to load the System 1 and 2 coordinate control files, after pressing the Load Coordinate Files menu. FIG. 2A shows an input dialog which allows the user to browse through the computer to locate System 1 control coordinate files. A message box, FIG. 2B, prompts the user to load the System 2 coordinate control files. FIG. 3A illustrates an input dialog which allows the user to browse through the computer to locate the System 2 coordinate files. Other variations are possible in which the System 1 and System 2 coordinate files are loaded in a different manner.

Figure 3B:
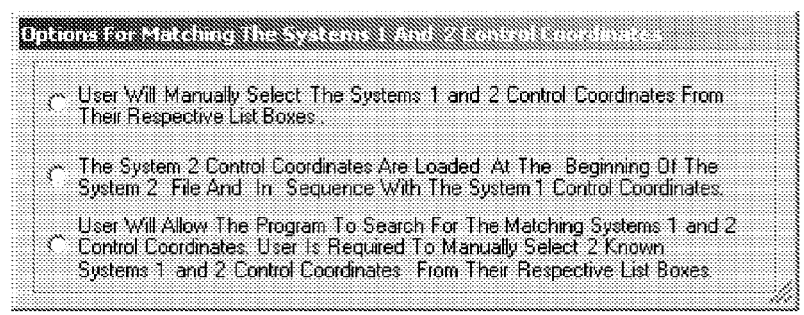
FIG. 3B shows a dialog box to provide the user with three options to match Systems 1 and 2 control coordinates from their respective list boxes, according to an embodiment of the present invention.
Figure 4A:
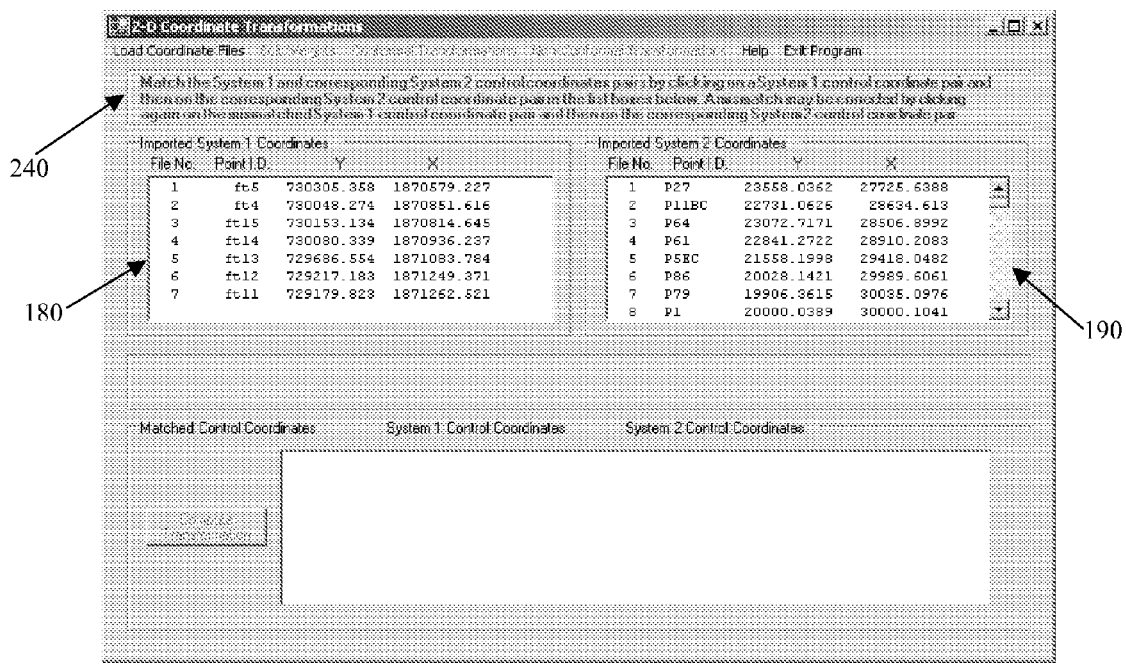
FIG. 4A illustrates a screenshot showing the Systems 1 and 2 control coordinates successfully loaded, according to an embodiment of the present invention.
Figure 4B:
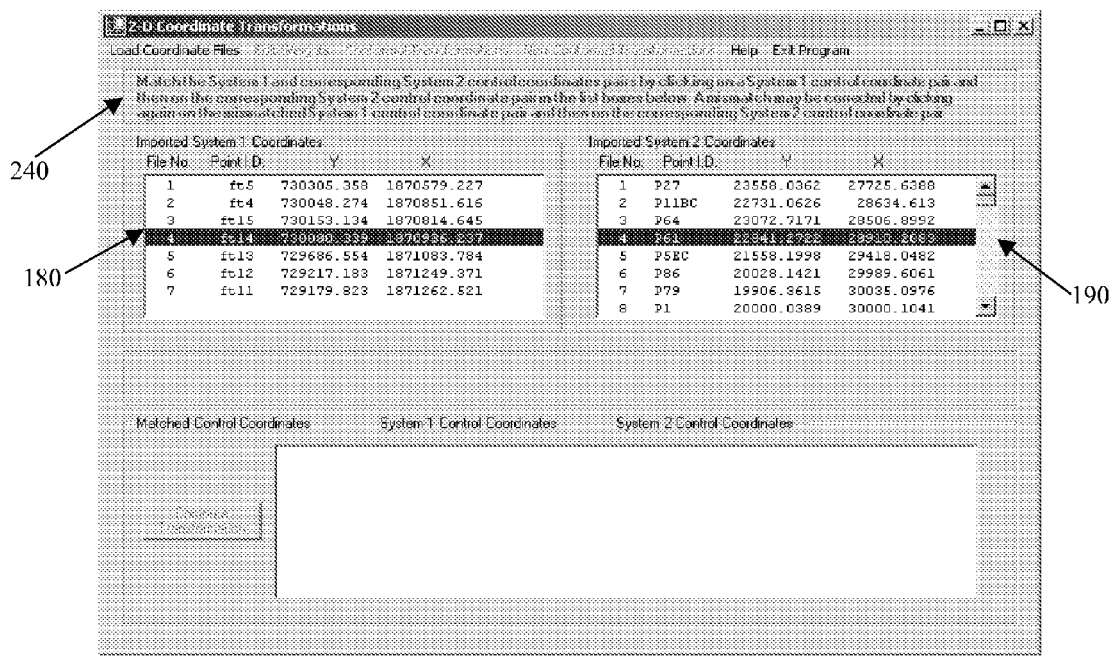
FIG. 4B illustrates a screenshot of a user matching the Systems 1 and 2 control coordinates, according to an embodiment of the present invention.

A dialog box, FIG. 3B, presents a number of matching options for the control coordinates. The system invites the user to select one of a plurality of options indicated to match the Systems 1 and 2 control coordinates from their respective list boxes. These options include, but are not limited to (1) the user manually selecting the System 1 and System 2 control coordinates; (2) the system loading the System 2 control coordinates at the beginning of the System 2 file in sequence with the System 1 control coordinates; and (3) the system automatically searches for and loads the matching System 1 and System 2 control coordinates. When the user begins matching the Systems 1 and 2 control coordinates, it will be seen why it is advantageous, although, not necessary, to place the System 2 control coordinate pairs at the beginning of the System 2 coordinate files, and in the corresponding order as the System 1 control coordinate pairs, since the matching System 2 control coordinate pairs are directly opposite from their System 1 counterparts, see FIG. 4A. The user may opt for this type of matching from the options for matching control coordinates. This option may be chosen as indicated from the dialog box of FIG. 3B. The screenshot of FIG. 4B shows the matching of the System 1 and corresponding System 2 control coordinates pairs by a user clicking on a System 1 control coordinate pair and then on the corresponding System 2 control coordinate pair in the coordinates list boxes 180 and 190. A mismatch may be corrected by clicking again on a mismatched System 1 control coordinate pair and then on the corresponding System 2 control coordinate pair. In this embodiment, message 240 instructs the user how to match and correct a mismatch.

Figure 5:
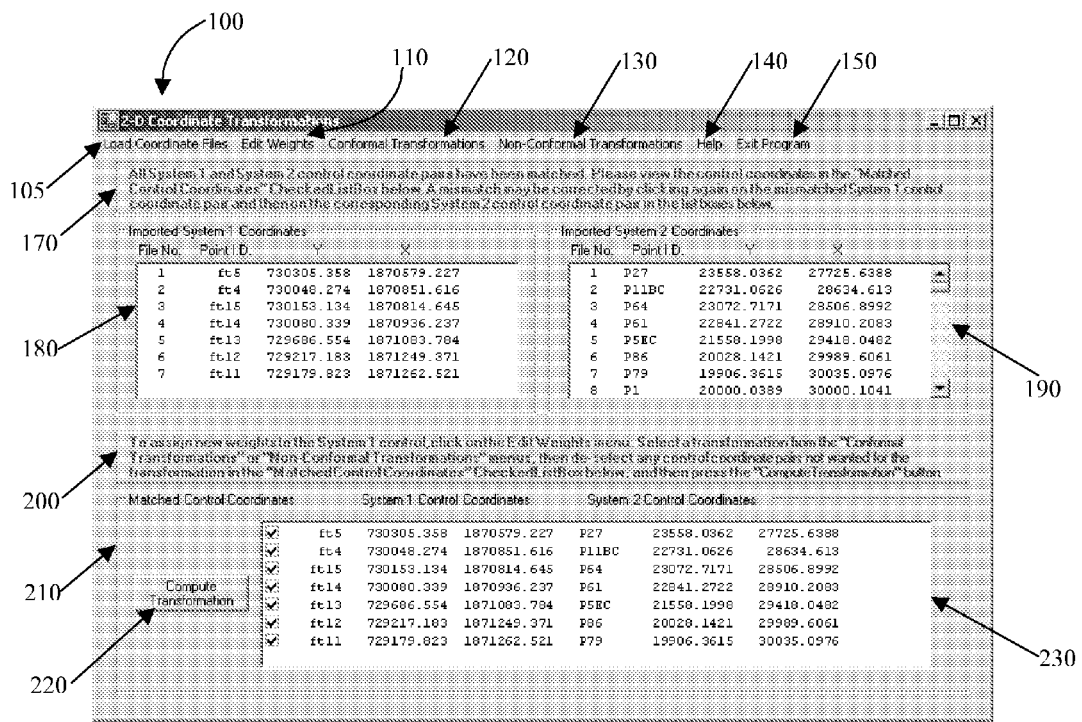
FIG. 5 illustrates a screenshot of the Main Form after the Systems 1 and 2 coordinate files have been successfully loaded, matched and all available coordinate pairs have been checked, according to an embodiment of the present invention.

FIG. 5 shows that the Systems 1 and 2 coordinate files have been successfully loaded/imported in their coordinates list boxes 180, 190 when selecting the option for the system program to automatically search for the matching control coordinates. As shown, the Systems 1 and 2 control coordinate pairs have been matched and placed in a Checked List Box 230 in a Matched Control Coordinates Box 210. All of the boxes are automatically checked in the Checked List Box 230. The message 170 instructs the user that a mismatch can be corrected and how a mismatch may be corrected. A message 200 reminds the user that the weights of the System 1 control coordinate pairs may be reassigned at any time. As shown, the Edit Weights menu 110 is active. The message also advises the user that a transformation can be selected and that any control coordinates not wanted for transformation can be deselected in the Checked List Box 230 of the Matched Control Coordinates box 210, as long as the user selects at least two known System 1 and System 2 coordinate pairs. The user may also keep all originally checked pairs for the transformation. In the embodiment of the present invention, a Conformal Transformations menu 120 and Non-Conformal Transformations menu 130 are active for selection. Upon selection, the selected transformation can be computed at any time by pressing Compute Transformation button 220.

Figure 6A:
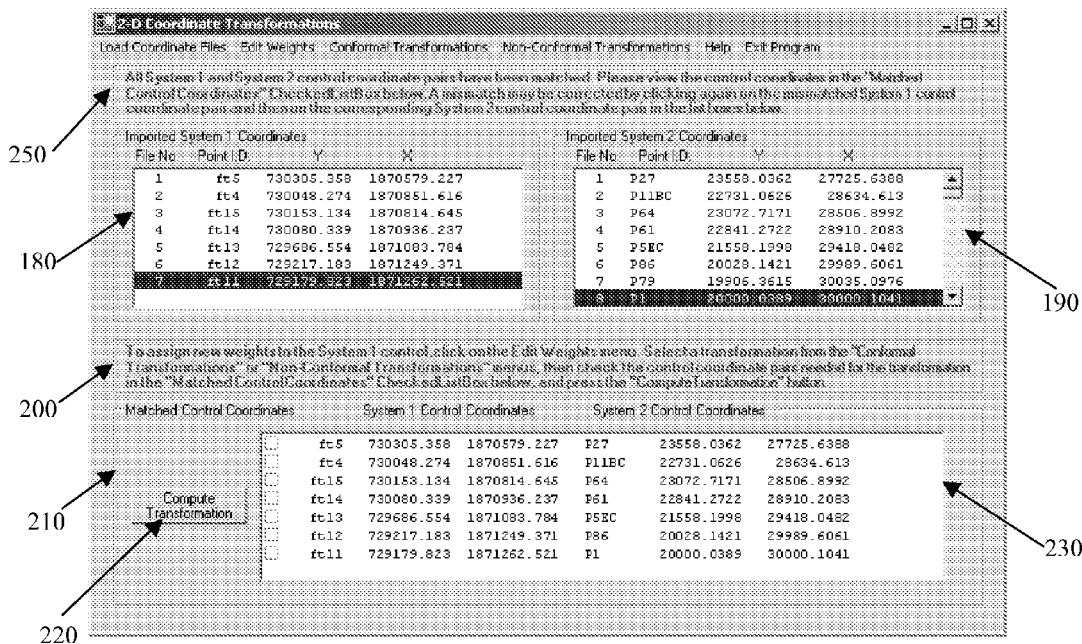
FIG. 6A illustrates the screenshot of a mismatch of Systems 1 and 2 control coordinate pairs, according to an embodiment of the present invention.
Figure 6B:
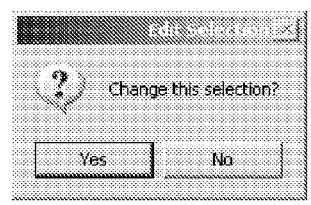
FIG. 6B shows a message box that prompts the user whether to change a line after finding a mismatch of coordinate pairs, according to an embodiment of the present invention.

FIG. 6A illustrates a mismatch of Systems 1 and 2 control coordinate pairs and providing the user the opportunity to correct the mismatch. As instructed 250, the user may correct the mismatch by clicking on the mismatched System 1 control coordinate pair and then on the corresponding System 2 control coordinate pair. Line 7 in the Imported System 1 Coordinates List Box 180 should match Line 7 in the Imported System 2 Coordinates List Box 190. The message box, shown in FIG. 6B, pops up to verify whether the user wishes to change a line after finding a mismatch of coordinate pairs.

Figure 7:
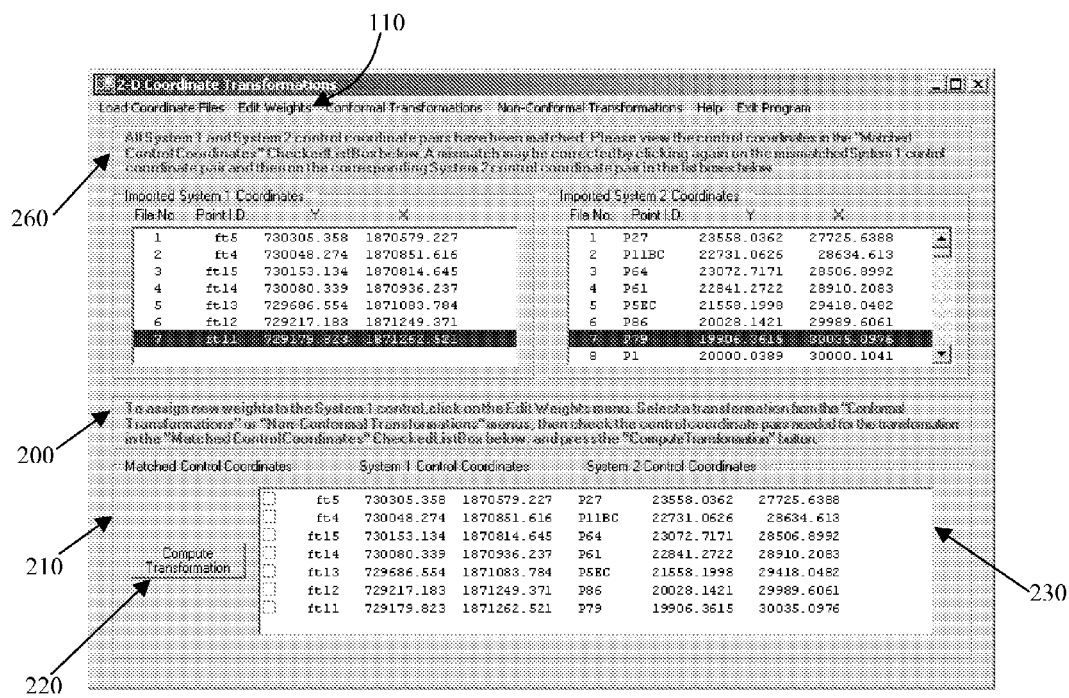
FIG. 7 illustrates a screenshot in which all of Systems 1 and 2 coordinate pairs are correctly matched, according to an embodiment of the present invention.

FIG. 7 shows all of Systems 1 and 2 coordinate pairs correctly matched. This form illustrates the case where the option to automatically match and check all the control coordinate pairs had not been selected. Similar to the case shown in FIG. 5, instructions 260 may be shown to allow the user to finally check for any mismatches of coordinate pairs and, if there are any, how such mismatches may be corrected.

Figure 8:
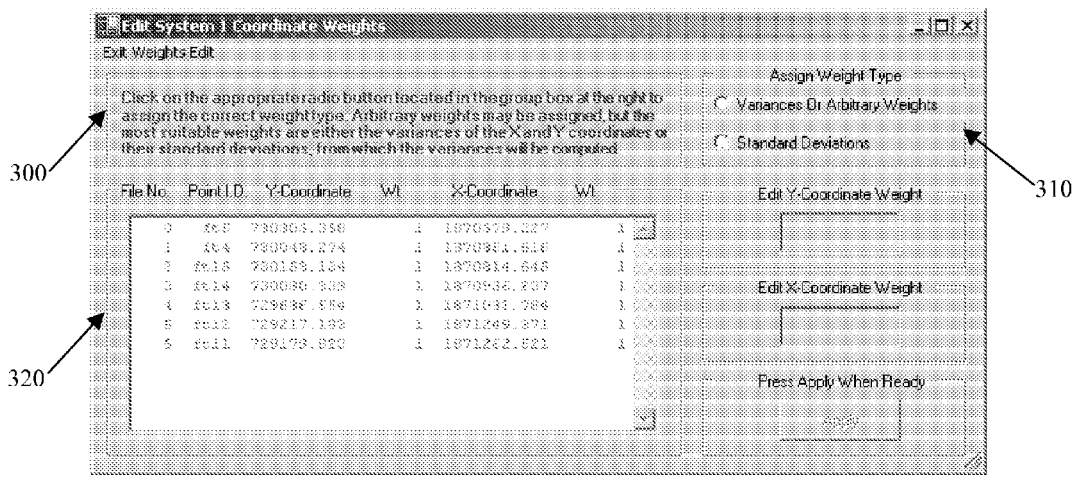
FIG. 8 illustrates a screenshot of the Edit Weights form showing all of the System 1 control coordinates and their currently assigned Y and X weights, according to an embodiment of the present invention.

As described above, prior to computing a transformation, the user may edit the System 1 weights or choose a transformation using the unit weights assigned to the System 1 control coordinates upon loading. The Edit Weights form, shown in FIG. 8, shows all of the System 1 control coordinates and their currently assigned Y and X weights. In this embodiment of the present invention, the radio buttons in Assign Weight Type group box 310 are activated when the user begins the Edit Weight form. One radio button is for variance or arbitrary weights. In the arbitrary weights, the user may assign arbitrary weights. Another radio button is for standard deviations.

Figure 9:
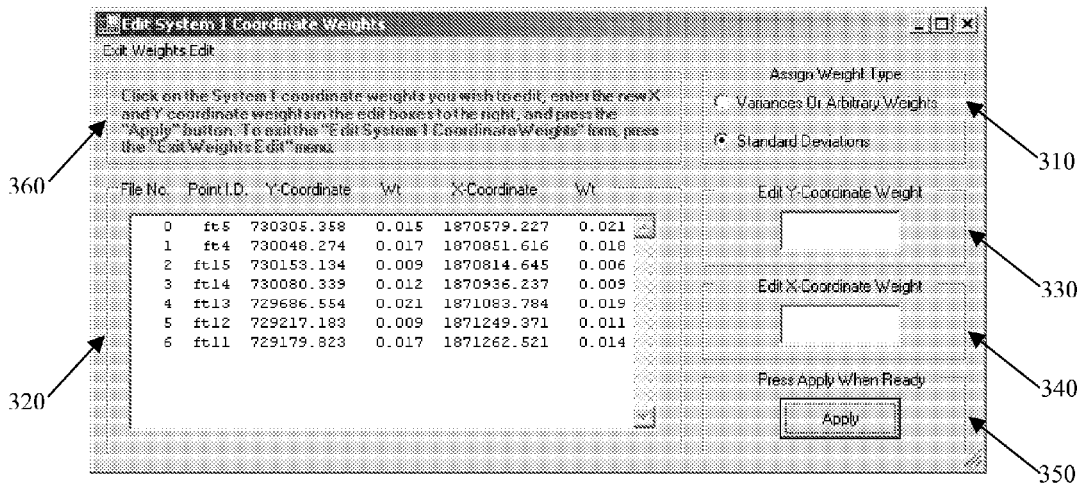
FIG. 9 illustrates a screenshot of the Edit Weights form showing all of the System 1 control coordinate Y and X weights changed after pressing the Standard Deviations radio button and changing the weights in accordance with the instruction at the top of the form, according to an embodiment of the present invention.

Instructions 300 may be shown to advise the user that the most suitable weights are either the variances of the X and Y coordinates or their standard deviations, from which the variances will be computed. The Edit Weights form, shown in FIG. 9, shows all of the System 1 control coordinate Y and X weights changed 320 after pressing the Standard Deviations radio button in the Assign Weight type group box 310, for example. The weights may be changed in accordance with the instructions 360 at the top of the form. The user may edit the Y-coordinate weight 330 and the X-coordinate weight 340. Upon completion, the user may apply the edits 350.

Figure 10A:
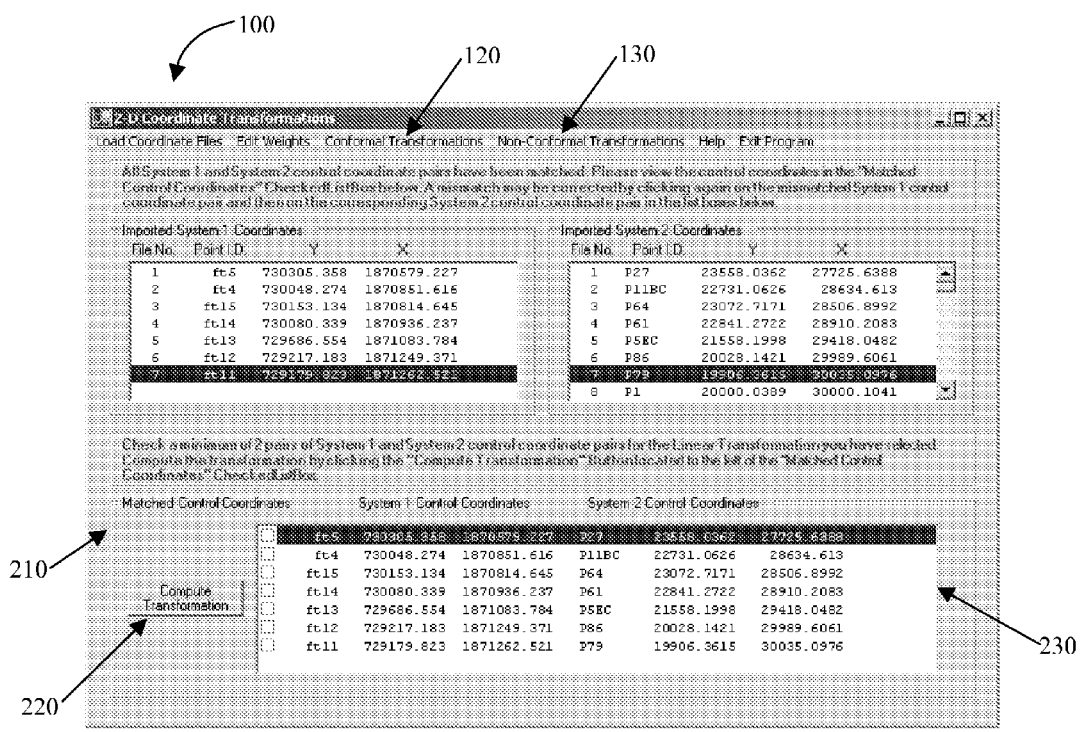
FIG. 10A illustrates a screenshot of the Main Form after selecting a linear transformation from the Conformal Transformations menu, in which no coordinate pairs have been checked as yet in the checked list box, according to an embodiment of the present invention.
Figure 10B:
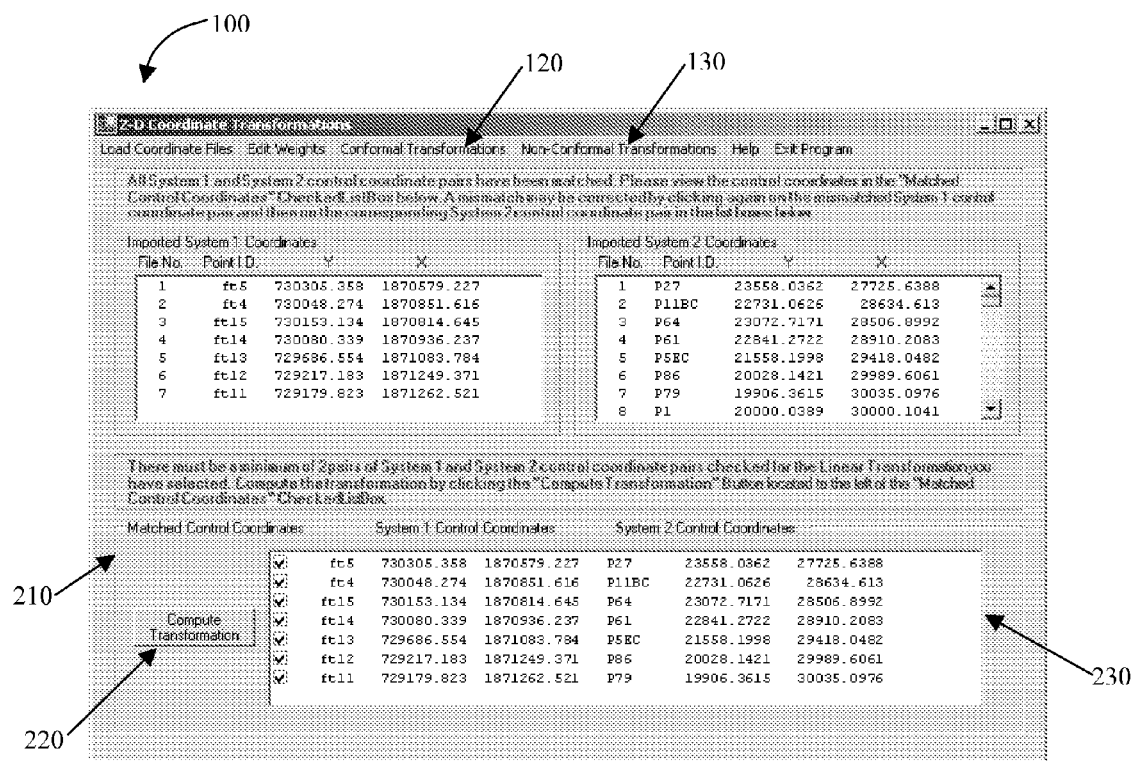
FIG. 10B illustrates a screenshot of the Main Form after selecting a linear transformation from the Conformal Transformations menu, in which all of the available coordinates in the Matched Control Coordinates checked list box have been checked, according to an embodiment of the present invention.

FIG. 10A illustrates a screenshot of the Main Form 100 after selecting a linear transformation from the Conformal Transformations menu 120. No coordinate pairs have been checked as of yet in the Checked List Box 230 in the Matched Control Coordinates Box 210. This form would follow the form of FIG. 7. The user is instructed to check at least two pairs of System 1 and System 2 control coordinate pairs for the linear transformation selected. FIG. 10B shows the Main Form 100 after checking all of the available coordinates in the Checked List Box 230 in the Matched Control Coordinates Box 210, prior to computing the transformation.

FIG. 10B also illustrates a screenshot of the Main Form 100 after selecting a Linear Transformation from the Conformal Transformations menu 120 of FIG. 5 according to an embodiment of the present invention. The Compute Transformation button 220 has not been pressed. In this embodiment of the present invention, all control coordinate pairs were already checked in the Checked List Box 230 in the Matched Control Coordinates Box 210. As described in FIG. 5, the user may deselect control coordinate pairs unwanted for computation by unchecking the box as long as two pairs of coordinate pairs remain checked.

Figure 11:
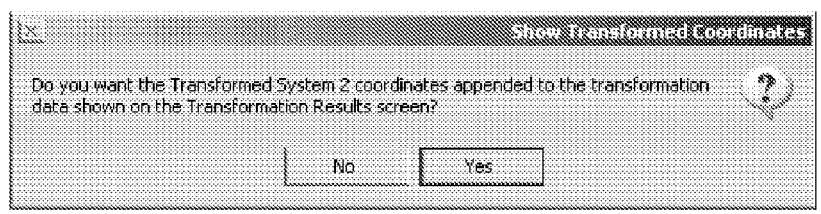
FIG. 11 shows a message box, which prompts the user after pressing the compute Transformation Button, according to an embodiment of the present invention.

This results in least-squares solutions, since only 2 control coordinate pairs were required according to an embodiment of the present invention. The user is apprised of a minimum number of coordinate pairs that must be checked to compute the transformation. If the user fails to select the minimum required number of coordinate pairs for a selected transformation, and presses the Compute Transformation button 220, a message box will appear asking the user to select the minimum number of coordinate pairs or choose a different transformation. A message box, shown in FIG. 11, pops up after the user presses the Compute Transformation button 220 of FIG. 10B. The message box of FIG. 11 queries whether the user wants the transformed System 2 coordinates appended to the transformation data shown on the Transformation Results screen, described in FIGS. 12A-12D.

Figures 12A, 12B:
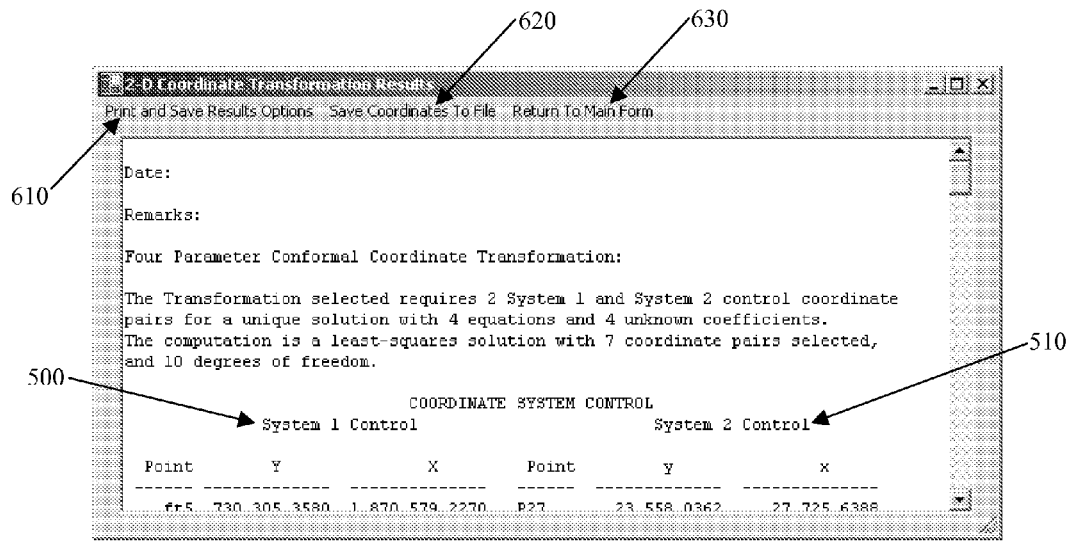
FIGS. 12A-FIG. 12D illustrate a series of screenshots showing the results of the transformation, according to an embodiment of the present invention.
Figure 12C:
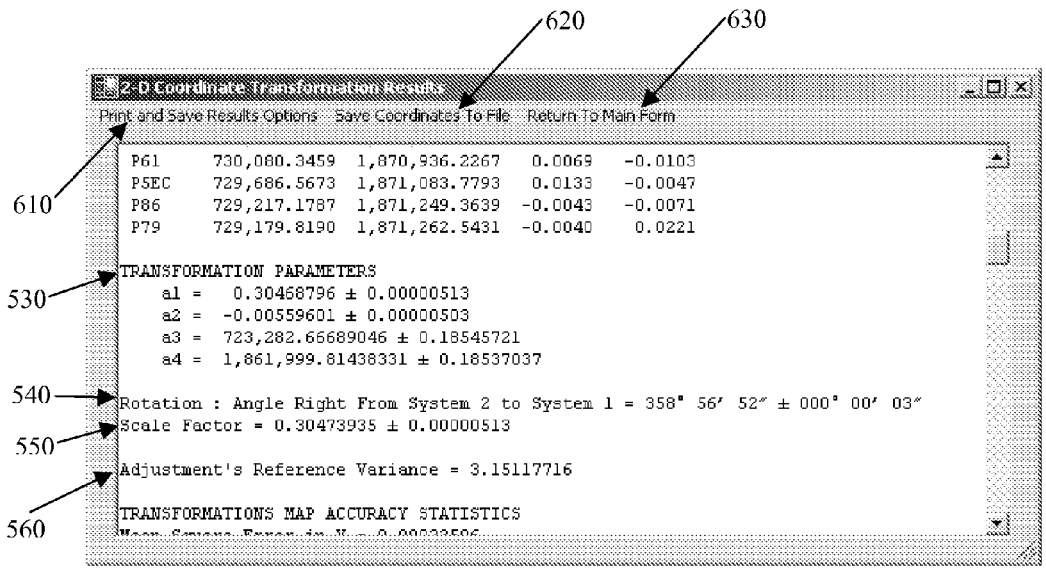
Figure 12D:
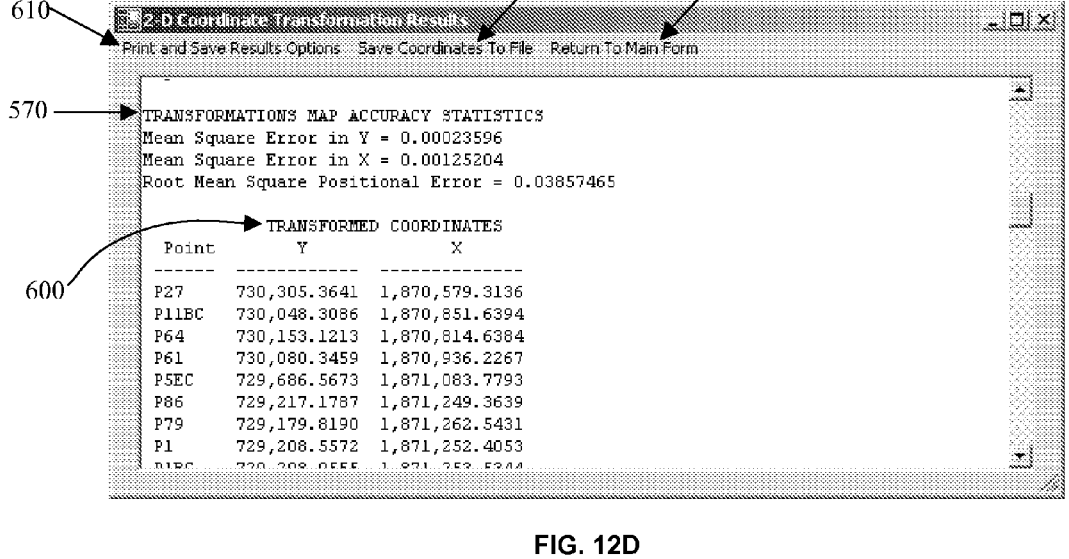

FIGS. 12A-12D illustrate a series of screenshots showing the results of a transformation, according to an embodiment of the present invention. In practice, the results would be displayed by scrolling through one screen if necessary. For purposes of illustration, FIG. 12A begins a results screenshot indicating a Four Parameter Conformal Coordinates Transformation as an example. The Coordinate System Control is displayed showing the System 1 Control coordinates 500 and the System 2 Control coordinates 510 respectively. FIG. 12B continues to display the Transformed System 2 Control Points and Residuals 520. FIG. 12C continues with displaying the Transformation Parameters 530; Rotation 540; Scale Factor 550; Adjustment's Reference Variance 560. FIG. 12D continues with a display of the Transformation Map Accuracy Statistics 570 including the Mean Square Error in Y; Mean Square Error in X; Root Mean Square Positional Error; and the Transformed Coordinates 600. FIGS. 12A-12D also illustrate a Print and Save Results Options 610; a Save Coordinates to File 620 and Return to Main Form 630 menu selections.

Figure 13:
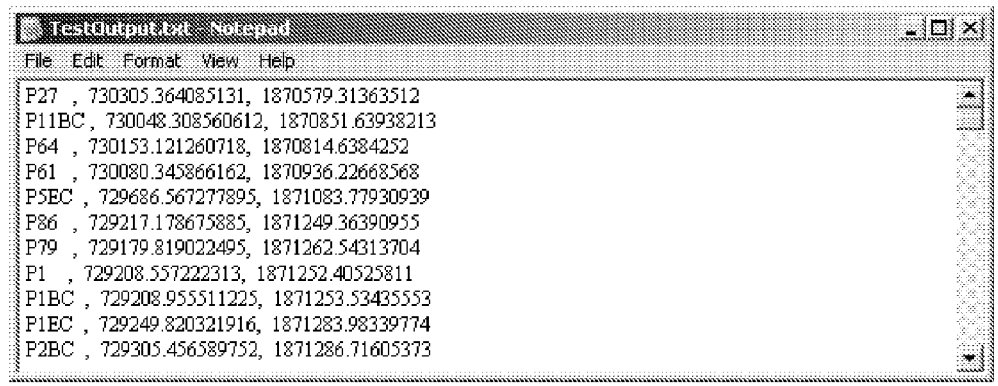
FIG. 13 illustrates a screenshot example of the output file formed when the user presses the Save Coordinates To File menu where the user has chosen a comma-delimited file, according to an embodiment of the present invention.

FIG. 13 illustrates a screenshot example of the out-put file formed when the user selects the Save Coordinates to File 620 from the menu, for instance, where the user has chosen a comma-delimited file.

Figure 14:
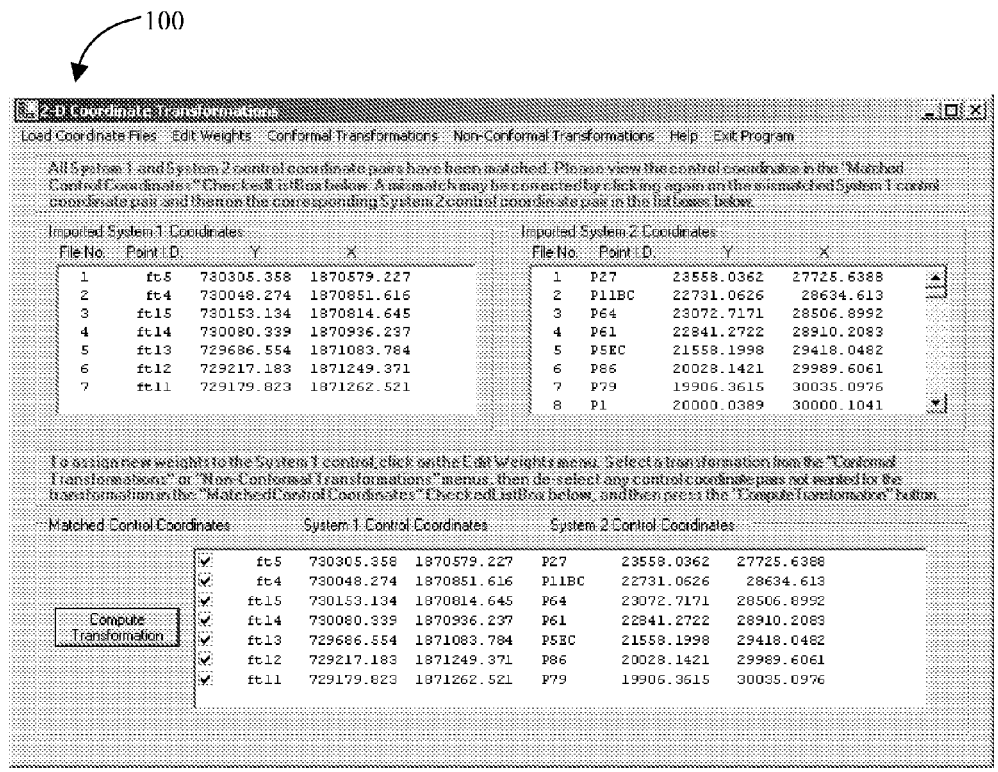
FIG. 14 illustrates a screenshot of the Main Form, ready for a new transformation, according to an embodiment of the present invention.

FIG. 14 illustrates a screenshot of the Main Form 100 upon return according to an embodiment of the present invention. After examining the results of the transformation, the user may return to the Main Form 100 to compute a new transformation by pressing the Return to Main Form 630 from the menu. The Main Form 100, ready for a new transformation, after the user presses the Return To Main Form 630 from the menu on the 2-D Coordinate Transformation Results form shown in FIGS. 12A-12D.

The appendices comprise the unique code for enabling various parts of the program and method for two-dimensional coordinate transformations according to embodiments of the present invention. The appendices particularly comprise code for the MainForm, Cpoint, SelectS1S2, Edit, Help, Save and Variables functions/forms. The Main Form code comprises unique subroutines XY_Calculate and Cholesky_Solution.

As such, according to an embodiment of the present invention, the code and algorithms of a program for computing transformations efficiently and implemented by way of a convenient graphical user interface have been described. Implementations of the present invention include a method or process, an apparatus or system, or software on a computer-accessible medium. Transformations are computed along with map accuracy statistics, which yield instantaneous information for a valid comparison. The program according to an embodiment of the present invention performs a unique method of least-squares and direct solutions using Cholesky and Gaussian functions which have been designed to be highly efficient. The Cholesky function in this program according to an embodiment of the present invention has been designed to be an efficient algorithm which is flexible to accommodate future least-squares solutions for curve-fitting and adjustment of traverse nets Matrices have been constructed for many of the conformal and non-conformal polynomial coordinate transformations in this program according to an embodiment of the present invention, by building case structures which would simply be functions of the particular transformations a user might choose. These case structures are unique, and comprise a large part of the main body of the program, embodied in a computer readable medium, according to an embodiment of the present invention. These conformal and non-conformal structures make it possible for a user to compute a complex transformation by simply pressing a menu button.

Further variations of some embodiments of the present invention include a least-squares computation of an alignment to be used as an extension of the program. In the process according to an embodiment, it is further unique to make the Cholesky and Gaussian solutions classes, rather than functions. The Two-Dimensional Coordinate Transformations can be modified to accommodate this accordingly.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description.

What is claimed is:

1. A computer implemented method for two-dimensional coordinate transformations, the computer comprising one or more processors for executing commands that direct operations of the computer and memory operatively coupled to the one or more processors, the method comprising the steps of:
   electronically providing an interface between a user and the computer on a processor;
   electronically loading on a processor a first set of control coordinates, each control coordinate of the first set including a pair of an X coordinate and a Y coordinate;
   electronically loading on a processor a second set of control coordinates, each control coordinate of the second set including a pair of an X coordinate and a Y coordinate;
   electronically assigning on a processor a unit weight for the X coordinate and Y coordinate of each pair of the first set of control coordinates;
   electronically enabling on a processor matching of a control coordinate of the first set with a corresponding control coordinate of the second set until all desired control coordinates have been matched, hereinafter referred to as, matched control coordinate pairs;
   electronically selecting on a processor a transformation type to be computed;
   electronically selecting on a processor at least a minimum required number of matched control coordinate pairs for the selected transformation; and
   electronically computing on a processor the selected transformation for the selected control coordinates of the second set resulting in a transformed coordinates of the second set;
   wherein the transformed coordinates of the second set are held to a value of the corresponding control coordinates of the first set for the selected transformation.

2. The method according to claim 1, wherein loading the first set of control coordinates and loading the second set of control coordinates comprises the user electronically loading on a processor one or more computer-readable files holding the control coordinates and the method further electronically displaying on a processor the loaded first set of control coordinates and displaying the loaded second set of control coordinates to the user.

3. The method according to claim 1, wherein loading of the second set of control coordinates occurs in a corresponding sequence of the loading of the first set of control coordinates and electronically displayed to the user.

4. The method according to claim 1, wherein the matched control coordinate pairs are automatically electronically matched, selected and displayed to the user on a processor, wherein the user electronically de-selects any matched control coordinate pair not desired for the transformation.

5. The method according to claim 1, further comprising electronically enabling on a processor the user to change the assigned unit weights of each pair of the first set of control coordinates prior to the computing step.

6. The method according to claim 1, wherein the step of electronically selecting at least the minimum required number of matched control coordinate pairs occurs prior to the step of electronically selecting a transformation to compute.

7. The method according to claim 1, wherein the transformation type is electronically selected on a processor from the group consisting of six parameter affine transformation, eight parameter projective transformation, general bivariate polynomial transformations, four parameter linear transformation and conformal bivariate polynomial coordinate transformations.

8. The method according to claim 1, further comprising electronically generating on a processor results of the computed transformation for display including a set of map accuracy statistics.

9. A computer-readable medium encoded with a computer program having computer-executable instructions configured to:
provide an interface between a user and a computer system;
load a first set of control coordinates, each control coordinate of the first set including a pair of an X coordinate and a Y coordinate;
load a second set of control coordinates, each control coordinate of the second set including a pair of an X coordinate and a Y coordinate;
assign a unit weight for the X coordinate and Y coordinate of each pair of the first set of control coordinates;
receive an indication to match a control coordinate of the first set with a corresponding control coordinate of the second set until all desired control coordinates have been matched, hereinafter referred to as, matched control coordinate pairs;
display the matched control coordinate pairs;
receive an indication for a selected transformation type to be computed;
receive a plurality of selected matched control coordinate pairs for the selected transformation; and
compute the selected transformation for the selected control coordinates of the second set resulting in a transformed coordinates of the second set;
wherein the transformed coordinates of the second set are held to a value of the corresponding control coordinates of the first set for the selected transformation.

10. The medium according to claim 9, wherein the instructions are configures to receive one or more changes in the matched control coordinate pairs to correct a mismatch.

11. The medium according to claim 9, wherein the instructions are configured to receive one or more changes in the assigned unit weights of each pair of the first set of control coordinates prior to the computing step.

12. The medium according to claim 9, wherein the instructions are configured to receive an indication to automatically generate matched control coordinate pairs and preselect all matched control coordinates prior to computing the transformation.

13. The medium according to claim 9, wherein the instructions are configured to determine a solution for the user selecting an exact number of matched coordinate pairs required for the transformation and for the user selecting more than the exact number of matched coordinate pairs required for the transformation.

14. The medium according to claim 9, wherein the instruction are configured to translate a plurality of X coordinates and Y coordinates of the second set of control coordinates to small numerical values prior to computing the selected transformation.

15. The medium according to claim 9, further comprising instructions configured to generate results of the computed transformation including a set of map accuracy statistics.

16. A computer system for two-dimensional coordinate transformations comprising:
one or more processors for executing commands that direct operations of the computer system;
memory operatively coupled to the one or more processors;
code executing within the one or more processors from the memory that directs the one or more processors to:
provide an interface between a user and a computer system;
load a first set of control coordinates, each control coordinate of the first set including a pair of an X coordinate and a Y coordinate;
load a second set of control coordinates, each control coordinate of the second set including a pair of an X coordinate and a Y coordinate;
assign a unit weight for the X coordinate and Y coordinate of each pair of the first set of control coordinates;
receive an indication to match a control coordinate of the first set with a corresponding control coordinate of the second set until all desired control coordinates have been matched, hereinafter referred to as, matched control coordinate pairs;
display the matched control coordinate pairs;
receive an indication for a selected transformation type to be computed;
receive a plurality of selected matched control coordinate pairs for the selected transformation; and
compute the selected transformation for the selected control coordinates of the second set resulting in a transformed coordinates of the second set;
wherein the transformed coordinates of the second set are held to a value of the corresponding control coordinates of the first set for the selected transformation.

17. The system of claim 16, wherein the matched control coordinate pairs are automatically matched, selected and displayed to the user, wherein the user de-selects any matched control coordinate pair not desired for the transformation.

18. The system according to claim 16, wherein the code further directs the one or more processors to receive one or more changes to the assigned unit weights of each pair of the first set of control coordinates prior to the computing step.

19. The system according to claim 16, wherein the transformation type is selected from the group consisting of six parameter affine transformation, eight parameter projective transformation, general bivariate polynomial transformations, four parameter linear transformation and conformal bivariate polynomial coordinate transformations.

20. The system according to claim 16, wherein the code further directs the one or more processors to generate results of the computed transformation for display including a set of map accuracy statistics.

* * * * *